(12) United States Patent
Hata et al.

(10) Patent No.: US 10,017,040 B2
(45) Date of Patent: Jul. 10, 2018

(54) DRIVE UNIT FOR A HYBRID VEHICLE

(71) Applicant: TOYOTA JIDOSHA KABUSHIKI KAISHA, Toyota-shi, Aichi-ken (JP)

(72) Inventors: Kensei Hata, Toyota (JP); Yuji Iwase, Toyota (JP); Yosuke Suzuki, Toyota (JP); Koichi Kato, Toyota (JP); Seitaro Nobuyasu, Toyota (JP); Taro Moteki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 290 days.

(21) Appl. No.: 15/033,739

(22) PCT Filed: Oct. 30, 2014

(86) PCT No.: PCT/JP2014/079516
§ 371 (c)(1),
(2) Date: May 2, 2016

(87) PCT Pub. No.: WO2015/064769
PCT Pub. Date: May 7, 2015

(65) Prior Publication Data
US 2016/0257189 A1    Sep. 8, 2016

(30) Foreign Application Priority Data

Nov. 1, 2013 (JP) ................................ 2013-228520

(51) Int. Cl.
*B60K 6/365* (2007.10)
*B60K 6/387* (2007.10)
(Continued)

(52) U.S. Cl.
CPC .............. *B60K 6/365* (2013.01); *B60K 6/387* (2013.01); *B60K 6/442* (2013.01); *B60K 6/445* (2013.01);
(Continued)

(58) Field of Classification Search
CPC .......... B60K 6/365; B60K 6/387; F16H 3/728
See application file for complete search history.

(56) References Cited

U.S. PATENT DOCUMENTS

2006/0111213 A1  5/2006  Bucknor et al.
2011/0245003 A1  10/2011 Takami
(Continued)

FOREIGN PATENT DOCUMENTS

JP    2008-120139 A    5/2008
JP    2011-213147 A    10/2011

*Primary Examiner* — Derek D Knight
(74) *Attorney, Agent, or Firm* — Oliff PLC

(57) ABSTRACT

A drive unit for a hybrid-vehicle to realize a variety of drive modes for covering various running conditions. A first planetary gear unit is included of a first carrier, a first sun gear, and a first ring gear. A second planetary gear unit is included of a second carrier, a second sun gear, and a second ring gear. A first clutch connects the engine selectively with the first carrier. A first motor is connected with the first sun gear, the second motor is connected with the second sun gear, and the first ring gear and the second ring gear are individually connected with an output member. The drive unit is with a second clutch for connecting the first carrier selectively with the second sun gear. In the drive unit, a reverse stage fixing-mode to propel the vehicle backwardly while changes the output member speed in accordance with the engine speed.

13 Claims, 9 Drawing Sheets

(51) Int. Cl.
*B60K 6/445* (2007.10)
*F16H 3/72* (2006.01)
*B60K 6/442* (2007.10)
*B60K 6/50* (2007.10)
*F16H 37/08* (2006.01)

(52) U.S. Cl.
CPC ............... *B60K 6/50* (2013.01); *F16H 3/727* (2013.01); *F16H 3/728* (2013.01); *B60Y 2200/92* (2013.01); *B60Y 2300/182* (2013.01); *B60Y 2300/192* (2013.01); *B60Y 2400/73* (2013.01); *F16H 2037/0873* (2013.01); *F16H 2037/0886* (2013.01); *F16H 2200/2038* (2013.01); *Y02T 10/6239* (2013.01); *Y02T 10/7258* (2013.01); *Y10S 903/911* (2013.01); *Y10S 903/915* (2013.01)

(56) References Cited

U.S. PATENT DOCUMENTS

| | | | | |
|---|---|---|---|---|
| 2011/0300982 A1* | 12/2011 | Park | ........................ | B60K 6/365 475/5 |
| 2011/0312462 A1* | 12/2011 | Park | ........................ | B60K 6/365 475/5 |
| 2011/0312464 A1* | 12/2011 | Park | ........................ | B60K 6/365 475/5 |
| 2015/0369343 A1* | 12/2015 | Lee | ........................ | B60K 6/445 475/5 |

* cited by examiner

[Fig. 1]
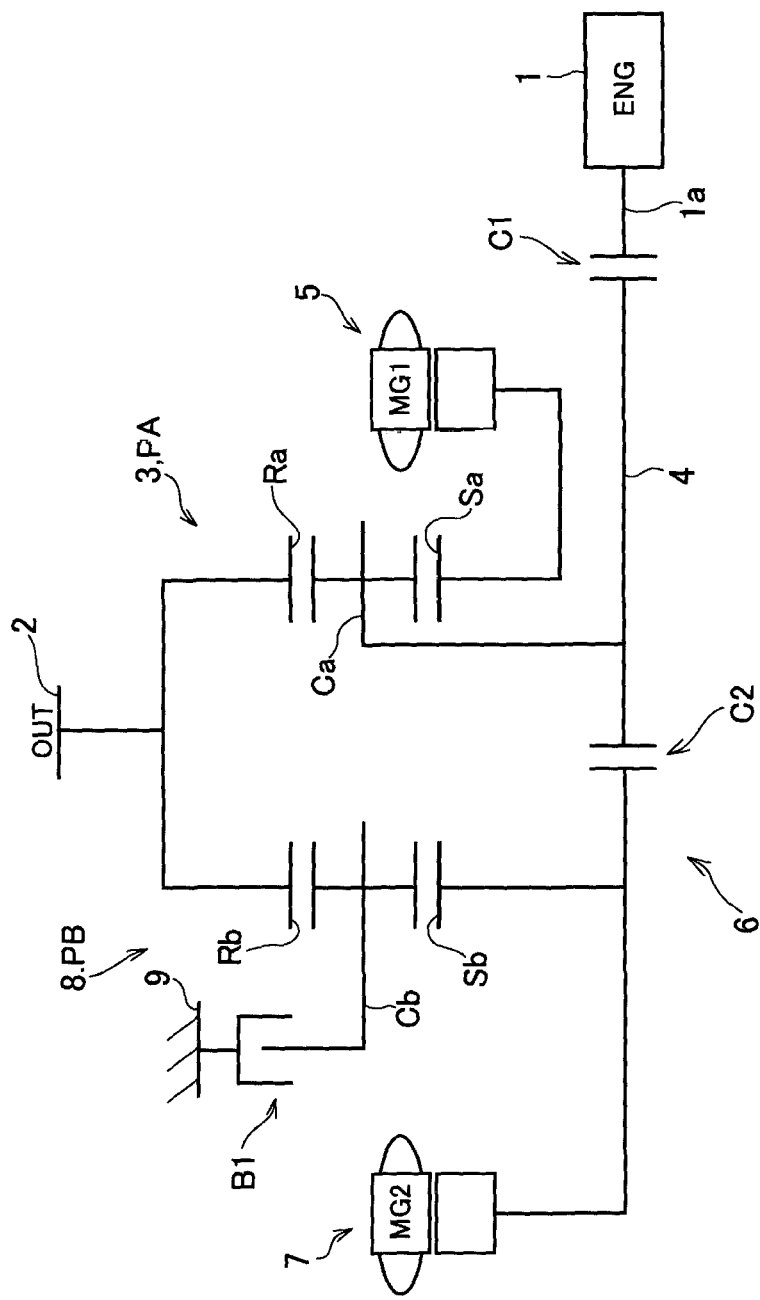

[Fig. 2]
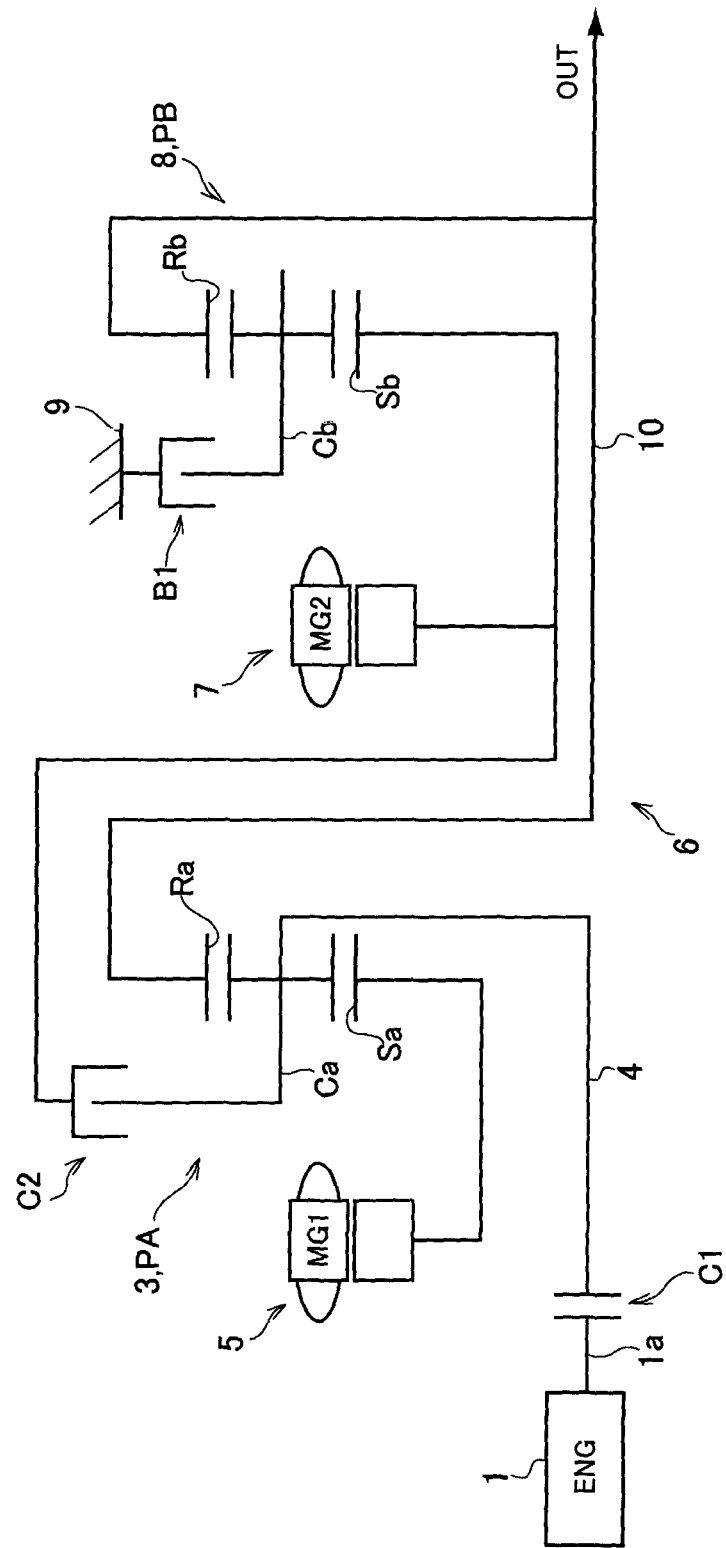

[Fig. 3]
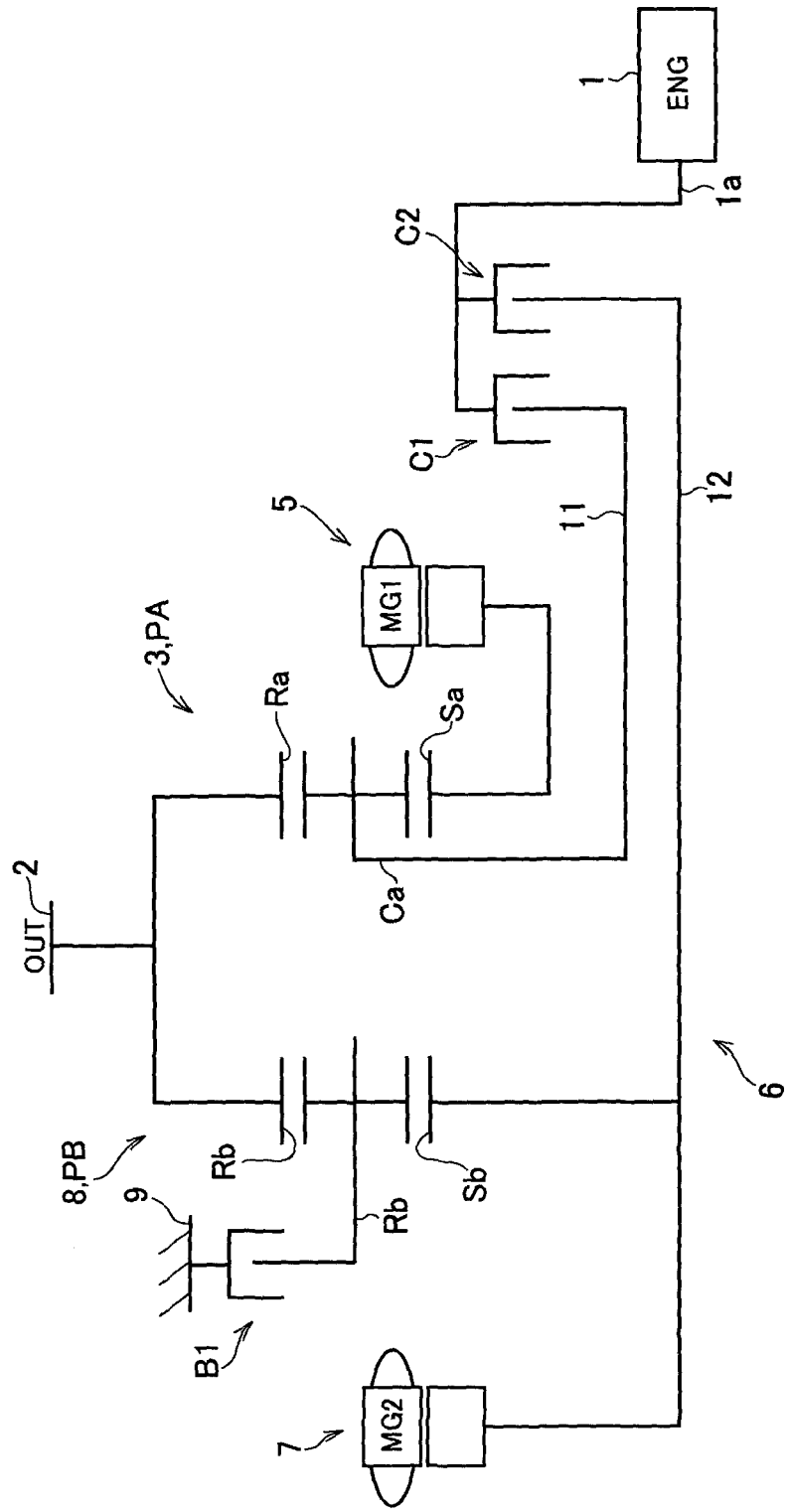

[Fig. 4]
|  |  | C1 | C2 | B1 |
|---|---|---|---|---|
| HV | First Hybrid Mode | + | − | + |
|  | Second Hybrid Mode | + | + | − |
|  | Motor Disconnecting Mode | + | − | − |
| EV | Normal Motor Mode | + | − | + |
|  | Engine Disconnecting Mode | − | − | + |
|  | Motor Torque Controlling Mode | − | + | + |
|  | Motor Speed Controlling Mode | − | + | − |
| Rev | Reverse Stage Fixing Mode | + | + | + |
|  | Normal Motor Mode | + | − | + |
[Fig. 5]
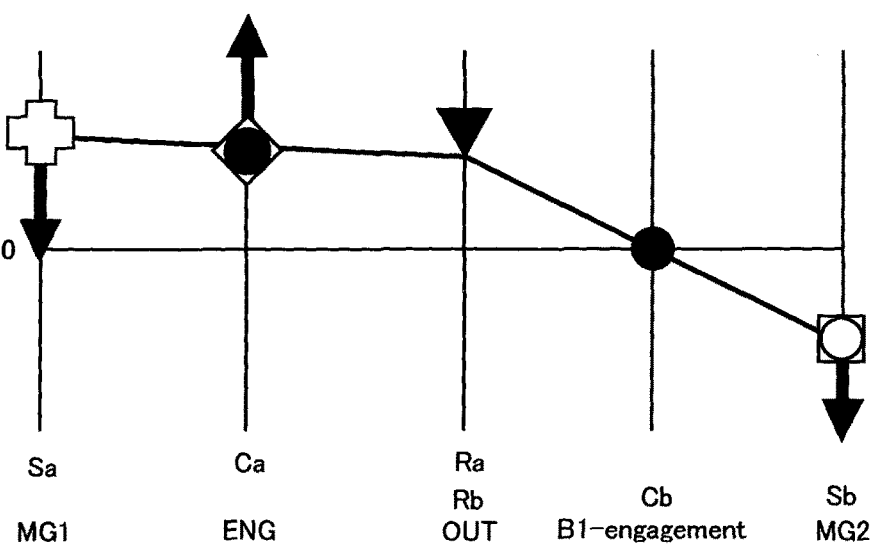

[Fig. 6]
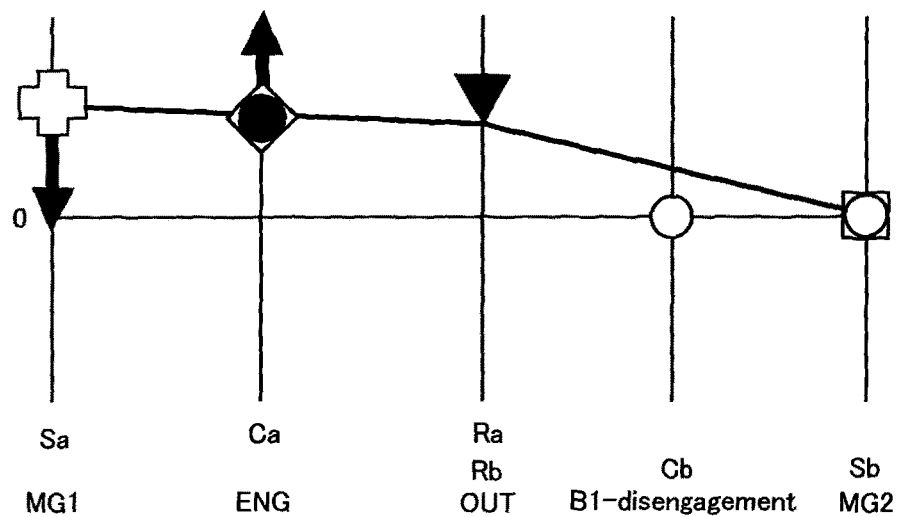
[Fig. 7]
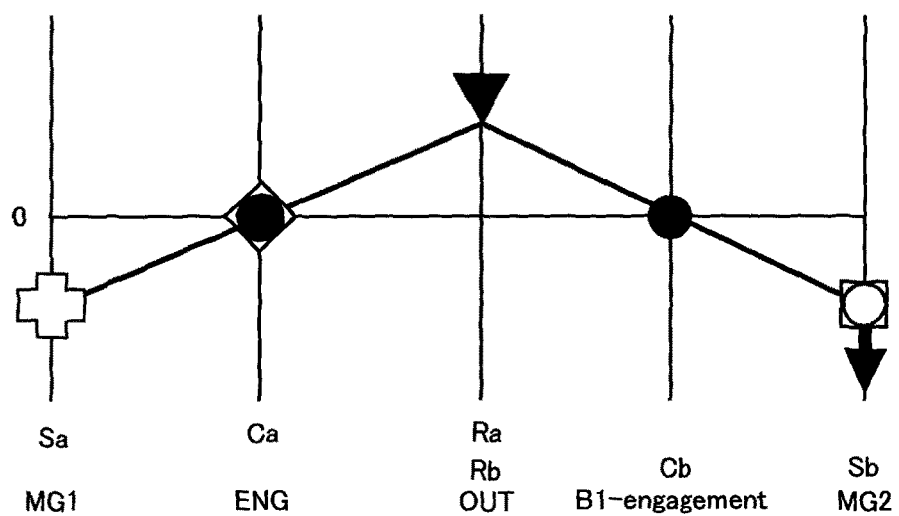

[Fig. 8]
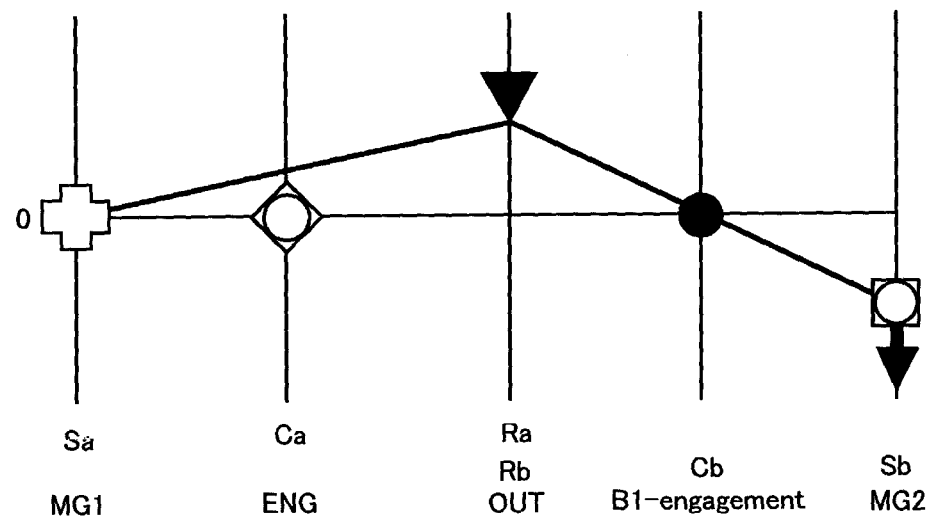
[Fig. 9]
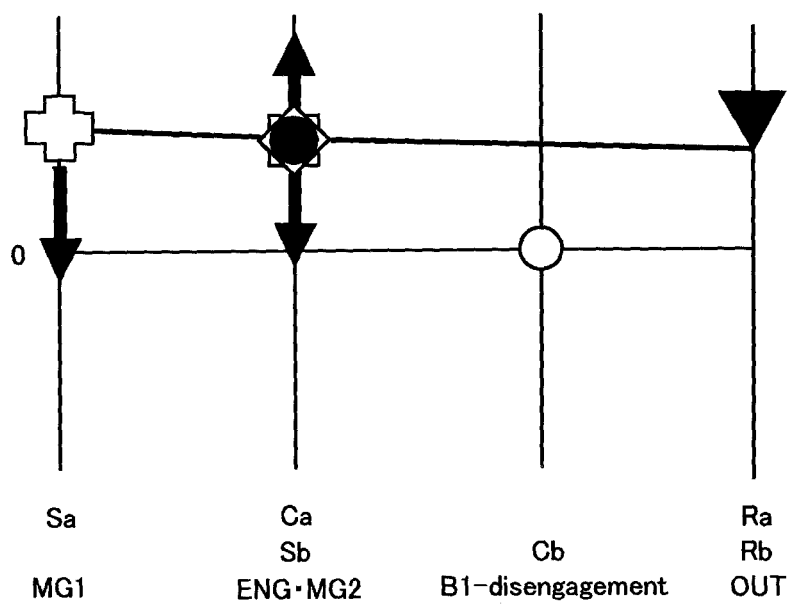

[Fig. 10]
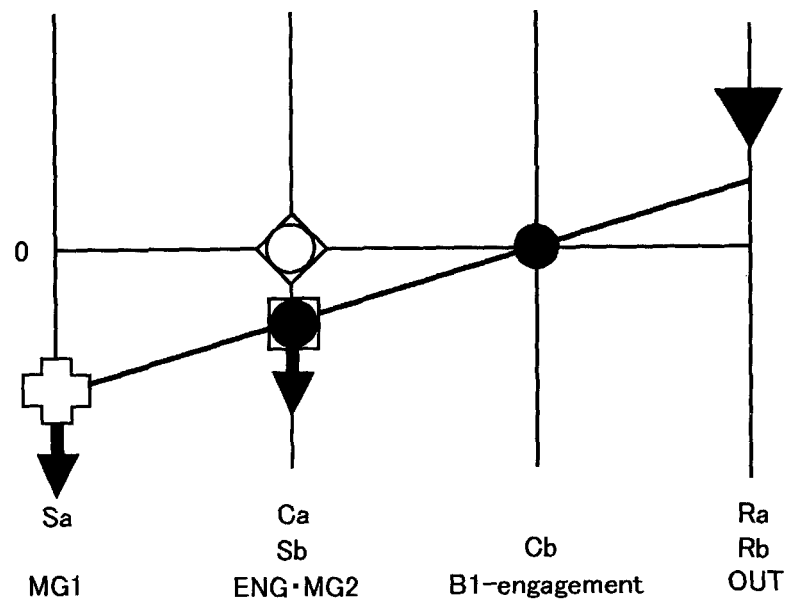
[Fig. 11]
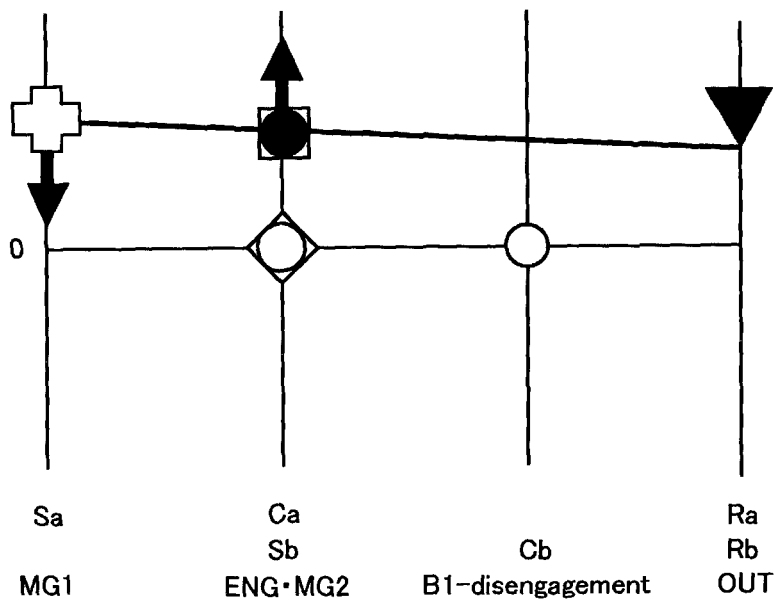

[Fig. 12]
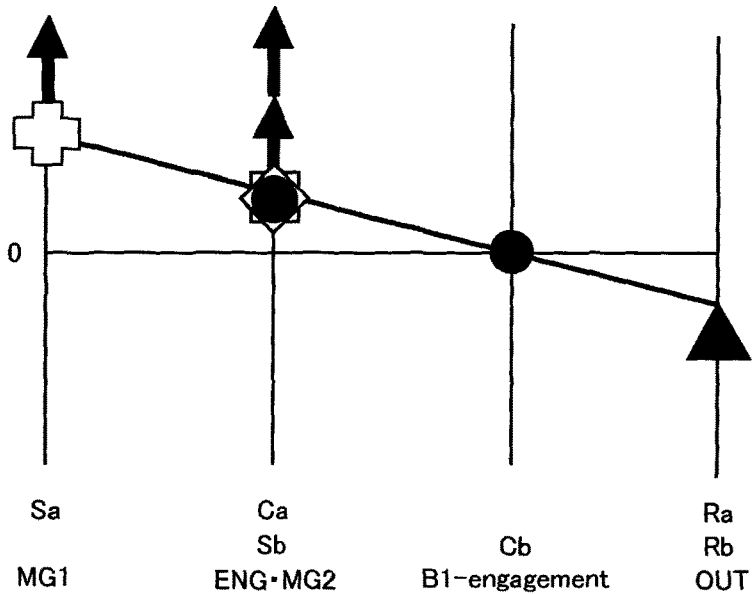
| Sa | Ca | | Ra |
| --- | --- | --- | --- |
| | Sb | Cb | Rb |
| MG1 | ENG·MG2 | B1-engagement | OUT |
[Fig. 13]
| | | C1 | C2 | B1 |
| --- | --- | --- | --- | --- |
| HV | First Hybrid Mode | + | − | + |
| | Second Hybrid Mode | + | + | − |
| | Motor Disconnecting Mode | + | − | − |
| EV | Normal Motor Mode | + | − | + |
| | Engine Disconnecting Mode | − | − | + |
| | Motor Torque Controlling Mode | − | + | + |
| | Motor Speed Controlling Mode | − | + | − |
| Rev | Reverse Stage Fixing Mode | + | + | + |
| | Reverse Stage Fixing Mode (Disconnect MG1) | − | + | + |
| | Normal Motor Mode | + | − | + |

[Fig. 14]
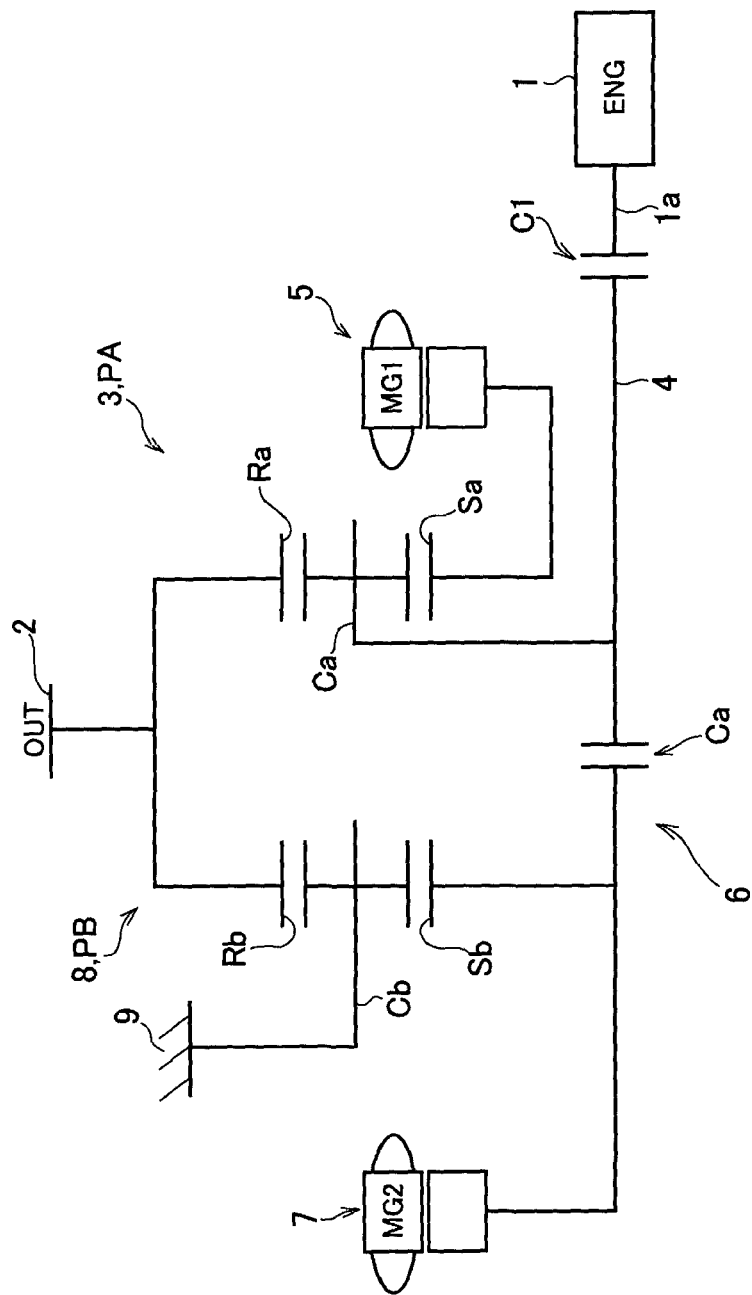

DRIVE UNIT FOR A HYBRID VEHICLE

TECHNICAL FIELD

This invention relates to a drive unit for a hybrid vehicle in which a prime move is comprised of an engine and a motor, and more particularly, to a drive unit for a hybrid vehicle in which an engine is allowed to be disconnected form a powertrain.

BACKGROUND ART

A prime mover of a hybrid vehicle is comprised of a plurality of different kinds of power units such as an engine adapted to generate a power by converting a thermal energy into a kinetic energy, and a motor having a generating function. In the hybrid vehicle, therefore, an energy efficiency can be optimized and an exhaust gas can be reduced by taking advantages of the engine and the motor. One example of the hybrid vehicle of this kind is described in Japanese Patent Laid-Open No. 2011-213147 (US2011/0245003).

In the hybrid drive device taught by Japanese Patent Laid-Open No. 2011-213147, a prime mover is comprised of an engine, and a first and a second motors. According to the teachings of Japanese Patent Laid-Open No. 2011-213147, the hybrid drive device is comprised of an input shaft connected with the engine, an output shaft connected with driving wheels, and a power distribution device as a single pinion type planetary gear unit. Specifically, the power distribution device is comprised of a ring gear connected with the output shaft to serve as an output element, a carrier connected with the input shaft to serve as a distribution rotary input element, and a sun gear connected with the first motor to serve as a reaction element. The hybrid drive device is further comprised of a speed change mechanism including four rotary elements such as a speed change input rotary element, a first output rotary element, a second output rotary element, and a fixed rotary element. Specifically, the speed change mechanism is comprised of: a Ravigneaux planetary gear unit having a first sun gear serving as a fixed rotary element, a common ring gear serving as a first output rotary element, a common carrier serving as a second output rotary element, and a second sun gear serving as a speed change input rotary element; and a single pinion type planetary gear unit having a ring gear, a carrier, and a sun gear. In addition, the hybrid drive device is further comprised of: a first engagement device that selectively fixes the second sun gear of the Ravigneaux planetary gear unit; a second engagement device that selectively fixes the ring gear of the single pinion type planetary gear unit; and a third engagement device that selectively fixes the common ring gear of the Ravigneaux planetary gear unit.

The hybrid drive device taught by Japanese Patent Laid-Open No. 2011-213147 is adapted to select an operation mode from a first split mode, a second split mode, and a third split mode. Specifically, the first split mode is selected in the middle speed range of the three split modes by engaging the first engagement device while disengaging the second and the third engagement devices. The second split mode is selected in the highest speed range of the three split modes by engaging the second engagement device while disengaging the first and the third engagement devices. The third split mode is selected in the lowest speed range of the three split modes by engaging the third engagement device while disengaging the first and the second engagement devices.

Japanese Patent Laid-Open No. 2008-120139 also describes a hybrid drive system in which a prime mover is comprised of an engine, a first motor, and a second motor. The hybrid drive system taught by Japanese Patent Laid-Open No. 2008-120139 is comprised of planetary gear unit serving as a power distribution device to perform a differential action among three rotary elements such as a sun gear connected with the first motor, a ring gear connected with an output shaft, and a carrier connected with the engine. The hybrid drive system is further comprised of a speed change mechanism adapted to select a speed ratio from two ratios. Specifically, the speed change mechanism is comprised of a stepped pinion type planetary gear unit having a diametrically large first sun gear and a diametrically small second sun gear, and two brake devices. The second motor is connected with an output side of the speed change mechanism, and an output shaft is connected with an output side of the speed change mechanism. In addition, the hybrid drive system is further comprised of a clutch device adapted to selectively connect the carrier of the power distribution device and the second motor thereby selectively connecting the engine with the second motor.

In the hybrid drive system taught by Japanese Patent Laid-Open No. 2008-120139, an operating mode can be selected from an output split mode and a directly-connected mechanical deceleration mode. Specifically, the output split mode is established by bringing the speed change mechanism into a neutral state while engaging the clutch device to connect the engine with the second motor. Meanwhile, the directly-connected mechanical deceleration mode is established by allowing the speed change mechanism to transmit a torque while engaging the clutch device to connect the engine with the second motor.

Thus, in the hybrid drive device taught by Japanese Patent Laid-Open No. 2011-213147, the drive mode is selected from the first split mode, the second split mode, and the third split mode depending on a vehicle speed and a required drive force. According to the teachings of Japanese Patent Laid-Open No. 2011-213147, the drive mode is shifted while synchronizing rotational speeds of the first output rotary element and the second output rotary element of the speed change mechanism individually with rotational speeds of the output rotary element and the distribution rotary input element of the power distribution device. Therefore, the speed change mechanism is not necessarily to be brought into the neutral state so that shocks and a torque drop can be reduced.

As described, in the hybrid drive device taught by Japanese Patent Laid-Open No. 2011-213147, the power distribution device and the speed change mechanism are comprised of three planetary gear units and three engagement devices, and a structure of the Ravigneaux planetary gear unit is rather complicated. Therefore, it is not easy to downsize the hybrid drive device taught by Japanese Patent Laid-Open No. 2011-213147 having such a complicated structure. As also described, in the hybrid drive device taught by Japanese Patent Laid-Open No. 2011-213147, the drive mode is selected from three modes depending on a vehicle speed. However, the hybrid vehicle is expected to be driven in various situations. For example, the hybrid vehicle may be driven under the situation where a state of charge (abbreviated as SOC hereinafter) is low. In contrast, the hybrid vehicle may be powered only by the motor. Otherwise, there may be a case where a large drive force is required when the hybrid vehicle runs backwardly. That is, it is difficult to cover all of those situations only by the drive mode selectable in the hybrid drive device taught by Japanese Patent Laid-Open No. 2011-213147.

Thus, the conventional hybrid drive units are required to be modified to increase available drive modes to cover various running conditions while being downsized and structurally simplified.

The present invention is conceived noting the foregoing technical problems, and an objective of the present invention is to provide a hybrid drive unit to realize a variety of drive modes for covering various running conditions.

DISCLOSURE OF INVENTION

The drive unit of the present invention is applied to a hybrid vehicle in which a prime mover is comprised of an engine, a first motor and a second motor. Specifically, the drive unit is comprised of: a first differential mechanism having a first input element, a first reaction element and a first output element; a second differential mechanism having a second input element, a second reaction element and a second output element; and a first clutch device adapted to connect the engine selectively with the first input element. In the drive unit, the first motor is connected with the first reaction element, the second motor is connected with the second input element, and the first output element and the second output element are individually connected with an output member. A drive mode of the drive unit includes a first hybrid mode where the vehicle is propelled in a forward direction by an output torque of the engine and an output torque of the second motor. In order to achieve the above-explained object, the drive unit is provided with a second clutch device adapted to connect the first input element selectively with the second input element; and the drive unit is adapted to establish a reverse stage fixing mode where the vehicle is propelled in a backward direction by at least the output torque of the engine while changing a rotational speed of the output member in accordance with a speed of the engine.

Under the first hybrid mode, the vehicle is propelled in the forward direction by delivering a synthesized torque of the output torques of the engine and the second motor to the output member. Specifically, the first hybrid mode is established by engaging the first clutch device thereby connecting the engine with the first input element, while disengaging the second clutch device thereby interrupting a power transmission between the first input element and the second input element. Meanwhile, the reverse stage fixing mode is established by engaging the first clutch device thereby connecting the engine with the first input element, while engaging the second clutch device thereby connecting the first input element with the second input element.

The drive unit is further provided with a brake device adapted to selectively stop a rotation of the second reaction element. The drive mode includes a second hybrid mode where the vehicle is propelled in the forward direction by the output torques of the engine and the second motor delivered through a different route from that of the first hybrid mode.

Under the second hybrid mode the vehicle is propelled in the forward direction by distributing a synthesized torque of the output torques of the engine and the second motor to the output member and to the first motor. Specifically, the second hybrid mode is established by engaging the first clutch device thereby connecting the engine with the first input element, by engaging the second clutch device thereby connecting the first input element and the second input element, and by engaging the brake device thereby stopping a rotation of the second reaction element.

The drive mode further includes a motor speed controlling mode where the vehicle is propelled by the output torques of both of the engine and the second motor while controlling a rotational speed of the output member by changing rotational speeds of the first motor and the second motor.

Specifically, the motor speed controlling mode is established by disengaging the first clutch device thereby interrupting a power transmission between the engine and the first input element, by engaging the second clutch device thereby connecting the first input element and the second input element, and by disengaging the brake device thereby allowing the second reaction element to rotate.

The drive mode further includes a motor disconnecting mode where the vehicle is propelled in the forward direction by at least the output torque of the engine while interrupting a torque transmission between the second motor and the and the output member, and a torque transmission between the second motor and the engine, and the first motor.

Specifically, the motor disconnecting mode is established by engaging the first clutch device thereby connecting the engine with the first input element, by disengaging the second clutch device thereby interrupting the power transmission between the first input element and the second input element, and by disengaging the brake device thereby allowing the second reaction element to rotate.

The drive mode further includes a motor torque controlling mode where the vehicle is propelled by the output torques of both of the engine and the second motor while controlling the rotational speed of the output member by changing the output torques of the first motor and the second motor.

Specifically, the motor torque controlling mode is established by disengaging the is first clutch device thereby interrupting the power transmission between the engine and the first input element, by engaging the second clutch device thereby connecting the first input element and the second input element, and by engaging the brake device thereby stopping a rotation of the second reaction element.

The first motor may be situated next to the engine, and the first differential mechanism may be situated next to the first motor. In such a structure, the first clutch device and the second clutch device may be disposed between the engine and the first motor coaxially with an output shaft of the engine while being parallel to each other.

Meanwhile, the brake device may be disposed between the second differential mechanism and the second motor.

The first differential mechanism includes a single-pinion type first planetary gear unit comprising a first carrier serving as the first input element, a first sun gear serving as the first reaction element, and a first ring gear serving as the first output element. The second differential mechanism also includes a single-pinion type second planetary gear unit comprising a second sun gear serving as the second input element, a second carrier serving as the second reaction element, and a second ring gear serving as the second output element.

Thus, the drive unit of the present invention is applied to a hybrid vehicle having one engine and two motors. As described, the drive unit is comprised of the first and the second differential mechanisms individually provided with three rotary elements, the first clutch device for connecting the engine selectively with the first input element of the first differential mechanism, and the second clutch device for connecting the first input element of the first differential mechanism selectively with the second input element of the second differential mechanism. In the drive unit, it is possible to select the reverse stage fixing mode for propelling the vehicle backwardly by the output torque of the engine while changing a rotational speed of the output member in accordance with a predetermined ratio. Under the reverse stage fixing mode, the output torque of at least any one of the first and the second motors may be added to the output torque of the engine to propel the vehicle. According to the present invention, therefore, vehicle can be propelled in the backward direction by a sufficient drive force.

In case of propelling the vehicle in the forward direction in an energy efficient manner within a low speed range, the first hybrid mode is selected in the drive unit. Under the first hybrid mode, specifically, the vehicle is propelled in the forward direction by a synthesized torque of the engine and the second motor. In this situation, the torque transmission between the engine and the first input element of the first differential mechanism can be interrupted by disengaging the first clutch device, that is, the drive mode can be shifted to the engine disconnecting mode where the vehicle is powered only by the second motor. Alternatively, it is also possible to select the conventional normal motor mode to propel the vehicle only by the second motor.

As described, in order to establish the second hybrid mode, the drive unit of the present invention is provided with the brake device adapted to selectively stop a rotation of the second reaction element of the second differential mechanism. Under the second hybrid mode, specifically, the vehicle is propelled in the forward direction in an energy efficient manner within the high speed region by distributing the synthesized torque of the engine and the second motor to the output member and to the first motor. According to the present invention, therefore, the energy efficiency of the vehicle can be improved under the hybrid mode by shifting the drive mode between the first and the second hybrid mode depending on the vehicle speed. Specifically, given that the vehicle speed is low, the first hybrid mode is selected. By contrast, given that the vehicle speed is high, the second hybrid mode is selected.

Since the drive unit of the present invention is provided with the brake device, the motor speed controlling mode can be established in the drive unit. Under the motor speed controlling mode, the rotational speed of the output member can be controlled in accordance with the rotational speeds of the first motor and the second motor. That is, when the vehicle is powered by any one of the first motor and the second motor, the rotational speed of the first motor or the second motor can be adjusted arbitrarily. Therefore, the first motor and the second motor are allowed to be operated in such a manner that a total electric loss of those motors is reduced.

The brake device is also used to establish the motor disconnecting mode. Specifically, the motor disconnecting mode is established by disengaging the second clutch device and the brake device. Consequently, the torque will not be transmitted between the second motor and the output member, and between the second motor and the engine, and the first motor. That is, under the motor disconnecting mode, the second motor is allowed to be released irrespective of rotational speeds of the output member, the engine and the first motor. Therefore, a back electromotive force resulting from passively rotating the second motor will not be increased even if the vehicle speed is high. For this reason, an electrical loss caused by the back electromotive force can be reduced.

In addition, the motor torque controlling mode can be selected in the drive unit of the present invention. Under the motor torque controlling mode, the rotational speed of the output member can be controlled in accordance with the output torques of the first and the second motors. That is, when propelling the vehicle by the synthesized torques of the first motor and the second motor, a ratio in the synthesized torque between the torques of the first motor and the second motor can be adjusted arbitrarily. Therefore, the first motor and the second motor are allowed to be operated in such a manner that a total electric loss of those motors is reduced.

As also described, in the drive unit of the present invention, the first clutch device and the second clutch device can be disposed coaxially while being parallel to each other. In addition, a DCT clutch used in a conventional dual clutch transmission can be employed individually as the first clutch device and the second clutch device. Therefore, the drive unit can be downsized.

Thus, a variety of drive modes such as the reverse stage fixing mode, the first hybrid mode, the second hybrid mode, the engine disconnecting mode, the motor disconnecting mode, the motor speed controlling mode, and the motor torque controlling mode are available to be selected in the drive unit of the present invention. Those drive modes are realized by such a simple structure using two differential mechanisms and two clutch devices, and optionally using the brake device. According to the present invention, therefore, the drive mode can be selected from many kinds of modes depending on the driving condition, and those drive modes can be realized without complicating the structure of the drive unit.

BRIEF DESCRIPTION OF DRAWINGS

FIG. 1 is a skeleton diagram showing an example of a gear train of the hybrid drive unit according to the present invention that is applied to a front-engine front-wheel drive vehicle.

FIG. 2 is a skeleton diagram showing an example of a gear train of the hybrid drive unit according to the present invention that is applied to a front-engine rear-wheel drive vehicle.

FIG. 3 is a skeleton diagram showing another example of a gear train of the hybrid drive unit according to the present invention in which a first clutch device and a second clutch device are arranged coaxially parallel to each other.

FIG. 4 is a table showing engagement states of the first clutch device, the second clutch device and a brake device under each drive mode.

FIG. 5 is a nomographic diagram showing states of a first planetary gear unit and a second planetary gear unit under the first hybrid mode.

FIG. 6 is a nomographic diagram showing states of the first planetary gear unit and the second planetary gear unit under the motor disconnecting mode.

FIG. 7 is a nomographic diagram showing states of the first planetary gear unit and the second planetary gear unit under the normal motor running mode.

FIG. 8 is a nomographic diagram showing states of the first planetary gear unit and the second planetary gear unit under the engine disconnecting mode.

FIG. 9 is a nomographic diagram showing states of the first planetary gear unit and the second planetary gear unit under the second hybrid mode.

FIG. 10 is a nomographic diagram showing states of the first planetary gear unit and the second planetary gear unit under the motor torque controlling mode.

FIG. 11 is a nomographic diagram showing states of the first planetary gear unit and the second planetary gear unit under the motor speed controlling mode.

FIG. 12 is a nomographic diagram showing states of the first planetary gear unit and the second planetary gear unit under the reverse stage fixing mode.

FIG. 13 is a table showing engagement states of the first clutch device, the second clutch device and the brake device of the gear train shown in FIG. 3 under reverse stage fixing mode.

FIG. 14 is a skeleton diagram showing still another example of a gear train of the hybrid drive unit according to the present invention in which the brake device is omitted.

BEST MODE FOR CARRYING OUT THE INVENTION

Next, a preferred example of the present invention will be explained with reference to the accompanying drawings. The hybrid drive unit of the present invention is applied to a hybrid vehicle in which a prime mover is comprised of an engine and a plurality of motors. Specifically, the engine includes a gasoline engine, a diesel engine, an LPG engine, and an internal combustion engine using a fuel other than gasoline. Meanwhile, a motor having a generating function (i.e., a motor-generator) is generally used in the hybrid vehicle.

The hybrid vehicle thus structured can be powered not only by the engine, but also by both of the engine and the motor, or only by the motor (i.e., EV mode). In addition, an energy regeneration can be carried out by the motor while running the vehicle. Further, the engine is allowed to be stopped under the EV mode, and the stopping engine can be restarted according to need.

Under the EV mode, it is preferable to reduce a power loss resulting from rotating the engine passively. In addition, it is further preferable to reduce a power loss resulting from rotating the motor that is not generating power under the EV mode. To this end, a clutch device is used to disconnect the engine from a powertrain for delivering the power of the prime mover to driving wheels. The hybrid drive unit of the present invention is applied to the hybrid vehicle provided with the clutch device of this kind.

Referring now to FIG. 1, there is shown one example of the gear train of the hybrid vehicle to which the hybrid drive unit of the present invention is applied. In the example shown in FIG. 1, a power of the engine (ENG) 1 is partially distributed to an output member by a mechanical means, and the remaining power of the engine 1 is once converted into an electric power and then converted into a mechanical power again to be delivered to the output member.

The engine 1 is allowed to be adjusted, started and stopped electrically. Specifically, given that a gasoline engine is used as the engine 1, an opening degree of a throttle valve, an amount of fuel supply, a commencement and a termination of ignition, an ignition timing etc. are controlled electrically.

In the example shown in FIG. 1, an output gear 2 serves as the output member of the present invention. To this end, the output gear 2 is integrated with a first ring gear Ra of a first planetary gear unit PA and a second ring gear Rb of a second planetary gear unit PB. Therefore, the power is delivered from the output gear 2 to (not shown) driving wheels through a differential gear unit and a drive shaft (both not shown).

In order to distribute the power of the engine 1, the gear train shown in FIG. 1 is provided with a power distribution device 3. For example, a conventional differential mechanism used in a two-motor type hybrid vehicle may be used as the power distribution device 3, and the power distribution device 3 is adapted to perform a differential action among a first input element, a first reaction element and a first output element. In the example shown in FIG. 1, specifically, the single pinion type planetary gear unit PA is used as the power distribution device 3. Accordingly, the power distribution device 3 serves as the first differential mechanism of the present invention.

The first planetary gear unit PA is comprised of: a first sun gear Sa, the first ring gear Ra arranged concentrically with the first sun gear Sa, a pinion gear(s) meshing with both of the first sun gear Sa and the first ring gear Ra, and a first carrier Ca holding the pinion gear(s) in a manner such that the pinion gear(s) is/are allowed to rotate and revolve around the first sun gear Sa.

In the first planetary gear unit PA, the first carrier Ca is connected with an input shaft 4 serving as an input member of the drive unit so that the first carrier Ca serves as a first input element. The first sun gear Sa is connected with a first motor-generator (MG1) 5 serving as the first motor of the present invention so that the first sun gear Sa serves as a reaction element. The first ring gear Ra is integrated with the output gear 2 to serve as the first output element.

In order to selectively connect the engine 1 with a powertrain 6 for delivering the power from the prime mover to the driving wheels, a first clutch C1 is interposed between the input shaft 4 and an output shaft (i.e., a crankshaft) 1a. To this end, specifically, the clutch C1 is adapted to connect the engine 1 selectively with the input shaft 4, that is, with the first input element. For example, a friction clutch adapted to frictionally engage rotary members rotating relatively with each other may be used as the first clutch C1. Accordingly, the first clutch C1 serves as the first clutch device of the present invention.

In this preferred example, a permanent magnet type synchronous motor having a generating function is used as the first motor-generator 5. The first motor-generator 5 is connected with a battery through a not shown controller such as an inverter so that the first motor-generator 5 can be operated as a motor or a generator responsive to a current applied thereto.

The engine 1, the power distribution device 3 and the first motor-generator 5 are arranged coaxially, and a second motor-generator (MG2) 7 is also arranged coaxially with those elements. The second motor-generator 7 is adapted mainly to generate a drive force for propelling the vehicle, that is, to carry out an energy regeneration. As the first motor-generator 5, a permanent magnet type synchronous motor having a generating function is used as the second motor-generator 7. The second motor-generator 7 is also connected with a battery through a not shown controller such as an inverter so that the second motor-generator 7 can be operated as a motor or a generator responsive to a current applied thereto. In addition, the second motor-generator 7 is connected with the output gear 2 through a speed reducing device 8. Thus, the second motor-generator 7 serves as the second motor of the present invention.

The speed reducing device 8 is also arranged coaxially with the engine 1, the power distribution device 3, the first motor-generator 5 and the second motor-generator 7. In the example shown in FIG. 1, a differential mechanism, specifically, the single pinion type second planetary gear unit PB serves as the speed reducing device 8, and the speed reducing device 8 performs a differential action among a second input element, a second reaction element and a second output element. Thus, the speed reducing device 8 serves as the second differential mechanism of the present invention.

The second planetary gear unit PB is comprised of: a second sun gear Sb, the second ring gear Rb arranged concentrically with the first sun gear Sb, a pinion gear(s) meshing with both of the second sun gear Sb and the second ring gear Rb, and a second carrier Cb holding the pinion gear(s) in a manner such that the pinion gear(s) is/are allowed to rotate and revolve around the second sun gear Sb.

In the second planetary gear unit PB, the second sun gear Sb is connected with the second motor-generator 7 so that the second sun gear Sb serves as a second input element. The second ring gear Rb is also integrated with the output gear 2 to serve as the second output element. That is, the first ring gear Ra is connected with the second ring gear Rb in a manner to rotate integrally therewith. To this end, specifically, the output gear 2 is connected individually with an outer circumferential portions of the first ring gear Ra and the second ring gear Rb. Alternatively, it is also possible to form the output gear 2 integrally with the first ring gear Ra and the second ring gear Rb. In order to allow the second carrier Cb to serve as the second reaction element, the second carrier Cb is provided with a brake B1 serving as the brake device of the present invention.

The brake B1 is partially fixed to a fixing portion 9 such as a casing of the drive unit. Therefore, a rotation of the second carrier Cb serving as the second reaction element can be selectively stopped by engaging the brake B1. For this purpose, a friction brake adapted to frictionally engage a rotary member with a fixing portion is used as the brake B1. Instead, a dog brake adapted to reduce a rotational speed of the second carrier Cb to zero by mechanically engaging the rotary member with the fixing portion may also be used as the brake B1. Given that the dog brake is used as the brake B1, a range of a torque transmitting capacity may be widened at a design phase in comparison with that of the friction brake. In addition, the dog brake does not require energy to be engaged so that a power loss can be reduced.

In the gear train shown in FIG. 1, the brake B1 is interposed between the second planetary gear unit PB and the second motor-generator 7. That is, the brake B1 is arranged between diametrically larger members such as the second planetary gear unit PB and the second motor-generator 7. Therefore, the brake B1 is allowed to fit into a diametrically large space. Thus, the brake B1 can be arranged utilizing an inner space of the drive unit efficiently so that the drive unit can be downsized. For this reason, a design flexibility of the drive unit can be widened.

In order to selectively connect and disconnect the first input element of the first differential mechanism with/from the second input element of the second differential mechanism, a second clutch C2 serving as the second clutch device of the present invention is arranged between the first carrier Ca of the first planetary gear unit PA and the second sun gear Sb of the second planetary gear unit PB. That is, the first carrier Ca is connected selectively with the second sun gear Sb by the second clutch C2. For this purpose, a friction clutch adapted to frictionally engage rotary members rotating relatively with each other may also be used as the second clutch C2.

The preferred example of the gear trains shown in FIG. 1 is suitable for a front-engine front-wheel drive vehicle in which the prime mover is arranged in the front side of the vehicle to drive front wheels. However, as shown in FIG. 2, the hybrid drive unit of the present invention may be modified to be applied to a front-engine rear-wheel drive vehicle.

In the gear train shown in FIG. 2, an output shaft 10 serving as the output member of the drive unit is connected individually with the first ring gear Ra and the second ring gear Rb instead of the output gear 2 shown in FIG. 1. As can be seen from FIG. 2, the output shaft 10 extends along the common axis of the engine 1, the power distribution device 3, the first motor-generator 5, the second motor-generator 7 and the speed reducing device 8. In addition, not shown driving wheels are connected with one of the end portion of the output shaft 10 that is not connected with the first ring gear Ra and the second ring gear Rb, through a propeller shaft, the differential gear unit, and the drive shaft (those elements are not shown).

In addition, as shown in FIG. 3, the hybrid drive unit of the present invention may also be modified to arrange the first clutch C1 and the second clutch C2 coaxially parallel to each other between the engine 1 and the first motor-generator 5.

In the gear train shown in FIG. 3, a first input shaft 11 and a second input shaft 12 are employed as the input member instead of the input shaft 4 shown in FIG. 1. Specifically, the first input shaft 11 is a hollow shaft, and the second input shaft 12 is inserted into the first input shaft 11. Those input shafts 11 and 12 are arranged to connect the engine 1 with the speed reducing device 8 through the power distribution device 8.

One of the end portions of the first input shaft 11 is connected with the first carrier Ca, and the other end portion of the first input shaft 11 is connected with the output shaft 1a of the engine 1 through the first clutch C1. Therefore, the engine 1 is connected selectively with the first carrier Ca through the first clutch C1 and the first input shaft 11. As described, the second input shaft 12 is inserted into the first input shaft 11 so that the second input shaft 12 is allowed to rotate integrally with the first input shaft 11. Meanwhile, one of the end portions of the second input shaft 12 is connected with the second sun gear Sb, and the other end portion of the second input shaft 12 is connected with the output shaft 1a of the engine 1 through the second clutch C2. Therefore, the engine 1 is connected selectively with the second sun gear Sb through the second clutch C2 and the second input shaft 12. In addition, one of the rotary members of the first clutch C1 and one of the rotary members of the second clutch C2 are connected with the output shaft 1a of the engine 1 to be rotated integrally therewith.

In the gear train shown in FIG. 3, the first motor-generator 5 is situated next to the engine 1, and the power distribution device 3 is situated next to the first motor-generator 5. In order to connect the engine 1 selectively with the first carrier Ca through the first input shaft 11, and with the second sun gear Sb through the second input shaft 12, the first clutch C1 and the second clutch C2 are disposed between the engine 1 and the first motor-generator 5. To this end, specifically, the first clutch C1 and the second clutch C2 are arranged coaxially with the output shaft 1a of the engine 1 while being parallel to each other. In the gear train shown in FIG. 3, a DCT clutch used in a conventional dual clutch transmission is individually employed as the first clutch C1 and the second clutch C2. Therefore, the gear train shown in FIG. 3 can be downsized.

In the hybrid drive units shown in FIGS. 1 to 3, a drive mode can be selected from a hybrid mode (abbreviated as the HV mode) where the vehicle is powered by the engine 1, an electric vehicle mode (abbreviated as the EV mode) where the vehicle is driven by an electric power, and an reverse mode (abbreviated as the Rev mode) where the vehicle is driven in a backward direction. Specifically, the HV mode and the EV mode are selected depending on a running condition of the vehicle such as a vehicle speed, a required drive force governed by an opening degree of an accelerator, SOC of the battery and so on. For example, the HV mode is selected under a condition that the vehicle speed is high and an opening degree of the accelerator is wide enough to keep the vehicle speed. In contrast, the EV mode is selected under the condition that the SOC of the battery is sufficient and an opening degree of the accelerator is comparatively small.

More specifically, in the hybrid drive units shown in FIGS. 1 to 3, the HV mode can be selected from a "first hybrid mode", a "second hybrid mode", and a "motor disconnecting mode". Meanwhile, the EV mode can be selected from a "normal motor mode", an "engine disconnecting mode", a "motor torque controlling mode", and a "motor speed controlling mode". In turn, the Rev mode can be selected from the "normal motor mode" and a "reverse stage fixing mode". Engagement states of the first clutch C1, the second clutch C2 and the brake B1 under each drive mode are shown in FIG. 4 where "+" represents an engagement and "−" represents a disengagement of those engagement devices.

Under the first hybrid mode, the vehicle is propelled in the forward direction by delivering a synthesized torque of torques of the engine 1 and the second motor-generator 7 to the output member. Specifically, the first hybrid mode is established by engaging the first clutch C1 and the brake B1 while disengaging the second clutch C2. As can be seen from the nomographic diagram shown in FIG. 5, under the first hybrid mode, the engine 1 is operated to generate a drive torque, and the second motor-generator 7 is also operated as a motor to generate a drive torque. That is, the second motor-generator 7 is rotated in a counter direction to generate a drive torque. Meanwhile, the first motor-generator 5 is controlled to apply a braking torque to the reaction element of the first planetary gear unit PA. In this situation, the first motor-generator 5 may also be allowed to serve as a generator. Under the first hybrid mode, the vehicle is allowed to be propelled in the forward direction in an energy efficient manner mainly within a low speed region.

Here, in this specification, a definition of the "forward" rotational direction is a rotational direction same as a rotational direction of the engine 1, and a definition of the "counter" rotational direction is a rotational direction opposite to the rotational direction of the engine 1. In addition, a definition of a term "positive torque" or a "drive torque" is a torque generated by operating the first motor-generator 5 or the second motor-generator 7 as a motor, and a definition of a term "negative torque" or a "reaction torque" is a torque established by operating the first motor-generator 5 or the second motor-generator 7 as a generator.

The drive mode can be shifted from the first hybrid mode to the motor disconnecting mode by disengaging the brake B1. That is, the motor disconnecting mode is established by engaging the first clutch C1 while disengaging the second clutch C2 and the brake B1. As can be seen from in FIG. 6, under the motor disconnecting mode, the engine 1 is operated to generate a drive torque while stopping a rotation of the second motor-generator 7. Meanwhile, the first motor-generator 5 is controlled to establish a reaction torque against the reaction element of the first planetary gear unit PA. In this situation, the first motor-generator 5 may also be allowed to serve as a generator. Thus, under the motor disconnecting mode, the second motor-generator 7 is allowed to be released to stop the rotation thereof, irrespective of rotational speeds of the first ring gear Ra, the second ring gear Rb, the engine 1 and the first motor-generator 5. Under the motor disconnecting mode, therefore, a back electromotive force resulting from passively rotating the second motor-generator 7 will not be increased even if the vehicle speed is high. For this reason, an electrical loss caused by the back electromotive force can be reduced.

Under the first hybrid mode, the drive mode may also be shifted to the normal motor mode of the EV mode by stopping the engine 1. That is, the normal motor mode is also established by engaging the first clutch C1 and the brake B1 while disengaging the second clutch C2. As can be seen from the nomographic diagram shown in FIG. 7, under the normal motor mode, the second motor-generator 7 is operated as a motor to generate a drive torque. Thus, the normal motor mode is the EV mode generally employed in conventional two-motor type hybrid vehicles.

Under the normal motor mode, the drive mode can be shifted to the engine disconnecting mode by disengaging the first clutch C1. Specifically, the engine disconnecting mode is established by engaging the brake B1 while disengaging the first clutch C1 and the second clutch C2. As can be seen from the nomographic diagram shown in FIG. 8, under the engine disconnecting mode, the second motor-generator 7 is also operated as a motor to generate a drive torque. Under the engine disconnecting mode, therefore, the vehicle can be propelled by the drive torque generated by the second motor-generator 7, while interrupting a torque transmission between the engine 1 and the output members, and stopping a rotation of the first motor-generator 5. For this reason, the engine 1 and the first motor-generator 5 are prevented from being rotated passively so that power loss can be reduced thereby optimizing an energy efficiency.

As described, the drive unit of the present invention is provided with the second clutch C2 adapted to connect the first carrier C1 as the input element of the first planetary gear unit PA selectively with the second sun gear Sb as the input element of the second planetary gear unit PB. That is, the first hybrid mode, the normal motor mode, and the engine disconnecting mode are established by disengaging the second clutch C2. By contrast, the second hybrid mode, the motor torque controlling mode, the motor speed controlling mode, and the reverse stage fixing mode are established by engaging the second clutch C2.

Under the second hybrid mode of the EV mode, the vehicle is propelled in the forward direction by distributing the synthesized torque of the torques of the engine 1 and the second motor-generator 7 to the output member and to the first motor-generator 5. Specifically, the second hybrid mode is established by engaging the first clutch C1 and the second clutch C2 while disconnecting the brake B1. As can be seen from the nomographic diagram shown in FIG. 9, under the second hybrid mode, the drive torque is generated by the engine 1, and both of the first motor-generator 5 and the second motor-generator 7 are operated as generators to establish the reaction torques. Specifically, the second motor-generator 7 is rotated in the forward direction to establish a reaction torque, and the first motor-generator 5 is controlled to apply a reaction torque to the reaction element of the first planetary gear unit PA. In this situation, the first motor-generator 5 may also be allowed to serve as a generator. Under the second hybrid mode, the vehicle is allowed to be propelled in the forward direction in an energy efficient manner mainly within a high speed region.

Under the EV mode, the motor torque controlling mode is established by disengaging the first clutch C1 while engaging the second clutch C2 and the brake B1. As can be seen from the nomographic diagram shown in FIG. 10, under the motor torque controlling mode, both of the first motor-generator 5 and the second motor-generator 7 are operated as motors to generate drive torques. That is, both of the first motor-generator 5 and the second motor-generator 7 are rotated in the counter direction to generate drive torques. Under the motor torque controlling mode, the rotational speed of the output member can be controlled in accordance with output torques of the first motor-generator 5 and the second motor-generator 7. For example, when propelling the vehicle under the EV mode by a synthesized torque of the first motor-generator 5 and the second motor-generator 7, a ratio in the synthesized torque between the torques of the first motor-generator 5 and the second motor-generator 7 can be adjusted arbitrarily. Therefore, the first motor-generator 5 and the second motor-generator 7 can be operated in such a manner that a total electric loss of those motor-generators is reduced.

Under the motor torque controlling mode, the drive mode can be shifted to the motor speed controlling mode by disengaging the brake B1. Specifically, the motor speed controlling mode is established by engaging the second clutch C2 while disengaging the first clutch C1 and the brake B1. As can be seen from the nomographic diagram shown in FIG. 11, under the motor speed controlling mode, the second motor-generator 7 is operated as a motor to generate a drive torque. That is, the second motor-generator 7 is rotated in the forward direction to generate a drive torque. Meanwhile, the first motor-generator 5 is controlled to apply a reaction torque to the reaction element of the first planetary gear unit PA. Under the motor torque controlling mode, the rotational speed of the output member can be controlled in accordance with rotational speeds of the first motor-generator 5 and the second motor-generator 7. For example, when propelling the vehicle under the EV mode by the output torque of at least any one of the first motor-generator 5 and the second motor-generator 7, the rotational speeds of the first motor-generator 5 and the second motor-generator 7 can be adjusted arbitrarily. Therefore, the first motor-generator 5 and the second motor-generator 7 are allowed to be operated at the possible lowest speeds. For this reason, torques of the first motor-generator 5 and the second motor-generator 7 are substantially freed from a restriction so that a driving performance under the EV mode can be improved. In addition, the first motor-generator 5 and the second motor-generator 7 are also allowed to be operated in such a manner that a total loss of electric losses of those motor-generators is reduced.

In turn, under the Rev mode, the reverse stage fixing mode is established by engaging all of the first clutch C1, the second clutch C2, and the brake B1. As can be seen from the nomographic diagram shown in FIG. 11, under the reverse stage fixing mode, the drive torque is generated by the engine 1. For example, if the SOC of the battery is low, the vehicle is propelled backwardly only by the drive torque of the engine 1. In this case, a rotational speed of the engine 1 is reduced according to a predetermined speed ratio, and a rotational direction of the drive torque generated by the engine 1 is reversed to be delivered to the output member. Therefore, the rotational speed of the output member can be changed in accordance with the rotational speed of the engine 1, that is, a speed of the vehicle can be increased with an increase in the speed of the engine 1. Alternatively, if the SOC of the battery is sufficient, it is also possible to generate drive torques by operating both of the first motor-generator 5 and the second motor-generator 7 as motors. For example, the drive torque can be generated by rotating at least any one of the first motor-generator 5 and the second motor-generator 7 in the forward direction. Thus, under the reverse stage fixing mode, the drive torque can be ensured sufficiently to propel the vehicle in the backward direction so that the drive performance under the Rev mode can be improved.

Alternatively, under the Rev mode, it is also possible o establish the normal motor mode. That is, the vehicle may also be propelled backwardly only by the electric power. Specifically, the normal motor mode can be established under the Rev mode by carrying out the above-explained procedure for establishing the normal motor mode while rotating the second motor-generator 7 in the forward direction to deliver the drive torque to the output member.

In addition, in the gear train shown in FIG. 3, it is possible to disconnect the first motor-generator 5 from the powertrain 6 under the reverse stage fixing mode. Specifically, as can be seen from the table shown in FIG. 13, the first motor-generator 5 can be disconnected from the powertrain 6 under the reverse stage fixing mode by disengaging the first clutch C1 while engaging the second clutch C2 and the brake B1. In this case, a power loss resulting from rotating the first motor-generator 5 passively under the reverse stage fixing mode can be reduced so that the energy efficiency of the drive unit can be improved.

As described, total eight drive modes such as the "first hybrid mode", the "motor disconnecting mode", the "normal motor mode", the "engine disconnecting mode", the "second hybrid mode", the "motor torque controlling mode", the "motor speed controlling mode" and the "reverse stage fixing mode" are available to be selected in the drive unit of the present invention. In those drive modes, the "first hybrid mode", the "normal motor mode", the "engine disconnecting mode", the "motor torque controlling mode", and the "reverse stage fixing mode" are established by engaging the brake B1. This means that the brake B1 may be omitted if the drive modes other than the "first hybrid mode", the "normal motor mode", the "engine disconnecting mode", the "motor torque controlling mode", and the "reverse stage fixing mode" are not necessary. FIG. 14 shows an example of the gear train in which the second carrier Cb of the second planetary gear unit PB is fixed directly to the fixing portion 9 without using the brake B1.

As described, the hybrid drive unit of the present invention is applied to the hybrid vehicle using the engine 1 and the pair of motor-generators 5 and 7. The hybrid drive unit is comprised of the first planetary gear unit PA serving as the power distribution device 3, the second planetary gear unit PB serving as the speed reducing device 8, and the first clutch C1 for connecting the engine 1 selectively with the first carrier Ca of the first planetary gear unit PA. The hybrid drive unit is further comprised of the second clutch C2 for connecting the first carrier Ca of the first planetary gear unit PA with the second sun gear Sb of the second planetary gear unit PB. According to the present invention, therefore, the reverse stage fixing mode can be established in the hybrid drive unit. Under the reverse stage fixing mode, the hybrid vehicle is allowed to be propelled in the backward direction by delivering the output torque of the engine 1 to the output member 2 while changing the speed in accordance with a predetermined speed ratio. In this situation, the first motor-generator 5 and the second motor-generator 7 may also be used to power the vehicle. According to the hybrid drive unit of the present invention, therefore, ample drive force can be ensured when propelling the vehicle in the backward direction.

In the hybrid drive unit of the present invention, the first hybrid mode may also be selected to propel the vehicle in the forward direction in an energy efficient manner mainly within the low speed region. According to the present invention, the hybrid drive unit is further comprised of the brake B1 for selectively stopping the rotation of the second carrier Cb of the second planetary gear unit PB. The brake B1 contributes to establish the second hybrid mode for propelling the vehicle in the forward direction in an energy efficient manner mainly within a high speed region. According to the present invention, therefore, the energy efficiency can be optimized under the HV mode by shifting the drive mode between the first hybrid mode and the second hybrid mode depending on the vehicle speed.

In addition to the above-explained drive modes, the engine disconnecting mode, the motor disconnecting mode, the motor speed controlling mode, and the motor torque controlling mode are available to be selected in the drive unit of the present invention. According to the present invention, therefore, the drive mode may be selected from many options to deal with various kinds of driving conditions. As described, those drive modes are realized by such a simple structure using the first planetary gear unit PA, the second planetary gear unit PB, the first clutch C1 and the second clutch C2, and the brake B1. Thus, according to the present invention, the drive mode can be selected from many kinds of modes depending on the driving condition without complicating the structure of the drive unit.

The invention claimed is:

1. A drive unit for a hybrid vehicle in which a prime mover is comprised of an engine, a first motor and a second motor, comprising:
    a first differential mechanism comprised of a first input element, a first reaction element and a first output element;
    a second differential mechanism comprised of a second input element, a second reaction element and a second output element; and
    a first clutch device that is adapted to connect the engine selectively with the first input element;
    wherein the first motor is connected with the first reaction element, the second motor is connected with the second input element, and the first output element and the second output element are individually connected with an output member; and
    wherein a drive mode includes a first hybrid mode where the vehicle is propelled in a forward direction by an output torque of the engine and an output torque of the second motor;
    wherein the drive unit further comprises a second clutch device that is adapted to connect the first input element selectively with the second input element; and
    wherein the drive mode includes a reverse stage fixing mode where the vehicle is propelled in a backward direction by at least the output torque of the engine while changing a rotational speed of the output member in accordance with a speed of the engine.

2. The drive unit for a hybrid vehicle as claimed in claim 1,
    wherein the first hybrid mode includes a drive mode where the vehicle is propelled in the forward direction by delivering a synthesized torque of the output torques of the engine and the second motor to the output member;
    wherein the first hybrid mode is established by engaging the first clutch device thereby connecting the engine with the first input element, while disengaging the second clutch device thereby interrupting a power transmission between the first input element and the second input element; and
    wherein the reverse stage fixing mode is established by engaging the first clutch device thereby connecting the engine with the first input element, while engaging the second clutch device thereby connecting the first input element with the second input element.

3. The drive unit for a hybrid vehicle as claimed in claim 1, further comprising:
    a brake device that is adapted to selectively stop a rotation of the second reaction element; and
    wherein the drive mode includes a second hybrid mode where the vehicle is propelled in the forward direction by the output torques of the engine and the second motor delivered through a different route from that of the first hybrid mode.

4. The drive unit for a hybrid vehicle as claimed in claim 3,
    wherein the second hybrid mode includes a drive mode where the vehicle is propelled in the forward direction by distributing the synthesized torque of the output torques of the engine and the second motor to the output member and to the first motor; and
    wherein the second hybrid mode is established by engaging the first clutch device thereby connecting the engine with the first input element, by engaging the second clutch device thereby connecting the first input element and the second input element, and by engaging the brake device thereby stopping a rotation of the second reaction element.

5. The drive unit for a hybrid vehicle as claimed in claim 2,
    wherein the drive mode further includes a motor speed controlling mode where the vehicle is propelled by the output torques of both of the engine and the second motor while controlling a rotational speed of the output member by changing rotational speeds of the first motor and the second motor.

6. The drive unit for a hybrid vehicle as claimed in claim 5,
    wherein the motor speed controlling mode is established by disengaging the first clutch device thereby interrupting the power transmission between the engine and the first input element, by engaging the second clutch device thereby connecting the first input element and the second input element, and by disengaging the brake device thereby allowing the second reaction element to rotate.

7. The drive unit for a hybrid vehicle as claimed in claim 2,
    wherein the drive mode further includes a motor disconnecting mode where the vehicle is propelled in the forward direction by at least the output torque of the engine while interrupting the torque transmission between the second motor and the and the output member and a torque transmission between the second motor and the engine, and the first motor.

8. The drive unit for a hybrid vehicle as claimed in claim 7,
    wherein the motor disconnecting mode is established by engaging the first clutch device thereby connecting the engine with the first input element, by disengaging the second clutch device thereby interrupting the power transmission between the first input element and the second input element, and by disengaging the brake device thereby allowing the second reaction element to rotate.

9. The drive unit for a hybrid vehicle as claimed in claim 1,
    wherein the drive mode further includes a motor torque controlling mode where the vehicle is propelled by the output torques of both of the engine and the second motor while controlling the rotational speed of the output member by changing the output torques of the first motor and the second motor.

10. The drive unit for a hybrid vehicle as claimed in claim 9,
wherein the motor torque controlling mode is established by disengaging the first clutch device thereby interrupting the power transmission between the engine and the first input element, by engaging the second clutch device thereby connecting the first input element and the second input element, and by engaging the brake device thereby stopping a rotation of the second reaction element.

11. The drive unit for a hybrid vehicle as claimed in claim 1,
wherein the first motor is situated next to the engine, and the first differential mechanism is situated next to the first motor; and
wherein the first clutch device and the second clutch device are disposed between the engine and the first motor coaxially with an output shaft of the engine while being parallel to each other.

12. The drive unit for a hybrid vehicle as claimed in claim 2,
wherein the brake device is disposed between the second differential mechanism and the second motor.

13. The drive unit for a hybrid vehicle as claimed in claim 1,
wherein the first differential mechanism includes a single-pinion type first planetary gear unit comprising a first carrier serving as the first input element, a first sun gear serving as the first reaction element, and a first ring gear serving as the first output element; and
wherein the second differential mechanism includes a single-pinion type second planetary gear unit comprising a second sun gear serving as the second input element, a second carrier serving as the second reaction element, and a second ring gear serving as the second output element.

* * * * *